United States Patent [19]

Fairchild et al.

[11] 4,296,470
[45] Oct. 20, 1981

[54] LINK REGISTER STORAGE AND RESTORE SYSTEM FOR USE IN AN INSTRUCTION PRE-FETCH MICRO-PROCESSOR INTERRUPT SYSTEM

[75] Inventors: Peter T. Fairchild, Woodstock, Ga.; Joel C. Leininger, Boca Raton, Fla.

[73] Assignee: International Business Machines Corp., Armonk, N.Y.

[21] Appl. No.: 50,570

[22] Filed: Jun. 21, 1979

[51] Int. Cl.³ .............................................. G06F 9/40
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,293,610 | 12/1966 | Epperson et al. | 364/200 |
| 3,374,471 | 3/1968 | Smith | 364/200 |
| 3,440,619 | 4/1969 | Lehman et al. | 364/200 |
| 3,453,600 | 7/1969 | Stafford et al. | 364/200 |
| 3,811,114 | 5/1974 | Lemay et al. | 364/200 |
| 3,886,523 | 5/1975 | Ferguson et al. | 364/200 |
| 3,909,797 | 9/1975 | Goss et al. | 340/172.5 |
| 4,041,462 | 8/1977 | Davis et al. | 364/200 |
| 4,050,058 | 9/1977 | Garlic | 364/200 |
| 4,062,058 | 12/1977 | Haynes | 364/200 |
| 4,079,455 | 3/1978 | Ozga | 364/200 |
| 4,097,920 | 6/1978 | Ozga | 364/200 |
| 4,173,782 | 11/1979 | Dixon | 364/200 |

*Primary Examiner*—Gareth D. Shaw
*Assistant Examiner*—Thomas M. Heckler
*Attorney, Agent, or Firm*—Richard E. Bee

[57] ABSTRACT

A storage address link register system for enabling nested program branching wherein a first subroutine may call a second subroutine which is executed before the first subroutine returns program control back to the program which called it. The system includes a mechanism whereby the same set of storage address link registers may be used for nested branching both during the execution of a normal program and during the execution of an interrupt service program which breaks into the normal program and takes over control of the processor for a short interval of time. A mechanism is provided for saving the normal program values in the link registers at the commencement of the interrupt service program. A further mechanism is provided for monitoring the usage of the link registers by the interrupt program for enabling the normal program values to be restored in the link registers only after all interrupt program values have been removed from such link registers.

2 Claims, 7 Drawing Figures

LINK REGISTER STORAGE AND RESTORE SYSTEM FOR USE IN AN INSTRUCTION PRE-FETCH MICRO-PROCESSOR INTERRUPT SYSTEM

CROSS-REFERENCE TO RELATED APPLICATION

The present application is related to the following copending patent application filed on the same day and owned by the same assignee: Ser. No. 050,888, filed June 21, 1979, entitled "Instruction Pre-Fetch Microprocessor Interrupt System", the inventors being Joel C. Leininger, Floyd R. Bliss and Peter T. Fairchild. Both applications describe the same overall machine configuration but individually claim different inventive concepts embodied in such overall configuration.

DESCRIPTION 1. Technical Field

This invention relates to computer systems and interrupt mechanisms for a pre-fetch microprocessor system, and more particularly to the use of common link registers for both program subroutine and interrupt subroutine execution.

2. Background Art

Communication between an external source and a microprocessor is typically controlled by both the external source and the microprocessor. One type of microprocessor system is an instruction pre-fetch microprocessor in which instructions are fetched from storage in a manner such that the next instruction is fetched during the execution of the current instruction.

When an interrupt request is received from a peripheral device associated with the microprocessor, an interrupt routine is typically initiated which usually determines the cause of the interrupt and services the request. In executing the interrupt routine, it is often desirable to use various program-type subroutines which are already available in the microprocessor. This is especially true in a microprocessor where subroutines are normally provided for basic functions such as multiplication and division and the like. These subroutines may be used in a nested manner wherein, for example, the primary interrupt routine may call a trigonometric subroutine which in turn calls a square root subroutine which then calls a divide subroutine. The microprocessor program that was interrupted may have valid data addresses stored in one or more link registers associated with the microprocessor that are normally used with nested subroutines. Additional link registers must then be provided for use during execution of an interrupt subroutine. The need for additional registers increases the cost and overall complexity of the microprocessor system and results in an inefficient utilization of circuit components.

A need has thus arisen for a link register system in which data address information contained in a link register during normal microprocessor program execution can be stored. This storage permits an interrupt routine to utilize the same link registers for storage of subroutine addresses and then to be subsequently restored to the original contents of the link registers when the interrupt routine has been completed and reentry into the main microprocessor program is about to be initiated. A need has further arisen for a link register system including a subsystem for monitoring the number of link registers filled during an interrupt routine. Such a subsystem is necessary for restoring the contents of the link registers after execution of the interrupt routines.

SUMMARY OF THE INVENTION

In accordance with the present invention, a link register storage and restore system for use with an instruction pre-fetch microprocessor is provided. The link register system is implemented in a data processing system which includes a microprocessor apparatus operable in cycles and which includes a storage unit for storing data and instructions. The processor is responsive to instructions accessed to perform designated operations during a processor program and is responsive to interrupts from a plurality of peripheral devices associated with the processor. The system operates in a pre-fetch mode wherein a next succeeding instruction is fetched from the storage unit while a current instruction is being executed. The link register system includes an instruction address register coupled to the storage unit for holding the address of the next instruction to be pre-fetched in a sequence of instructions. A storage address register is coupled to the instruction address register and is coupled to the storage unit for receiving this next instruction address and accessing from the storage unit the next instruction during execution of the current instruction. Interrupt circuitry is provided for inhibiting updating of the instruction address register to a next succeeding instruction to be pre-fetched during the first succeeding cycle following acceptance of an interrupt request. An interrupt link register is provided for storing the current program values in the instruction address register, a page register and a status bits register when an interrupt request is accepted from one of the plurality of peripheral devices. Circuitry is provided for transferring the contents of the instruction address register, page register and status bits register to the interrupt link register upon initiation of an interrupt routine. Circuitry is further provided for restoring the contents of the instruction address register, page register and status bits register upon completion of execution of the interrupt routine, such that the instruction address register, page register and status bits register are ready for use by the interrupted program after the interrupt routine has been completed. Circuitry is further provided for recording each execution of each branch and link instruction and each return instruction while performing the interrupt routine. Additionally, circuitry is provided for determining the difference in the number of branch and link instructions and return instructions, such that when the number of return instructions is greater than the number of branch and link instructions, the return instruction causes the information stored in the interrupt link register to be automatically restored to the instruction address register, page register and status bits register for use by the interrupted program as it resumes operation.

BRIEF DESCRIPTION OF THE DRAWINGS

For a more detailed description of the present invention and for further objects and advantages thereof, reference is made to the following Description, taken in conjunction with the accompanying Drawings in which.

DESCRIPTION OF THE PREFERRED EMBODIMENT

Figure 1:
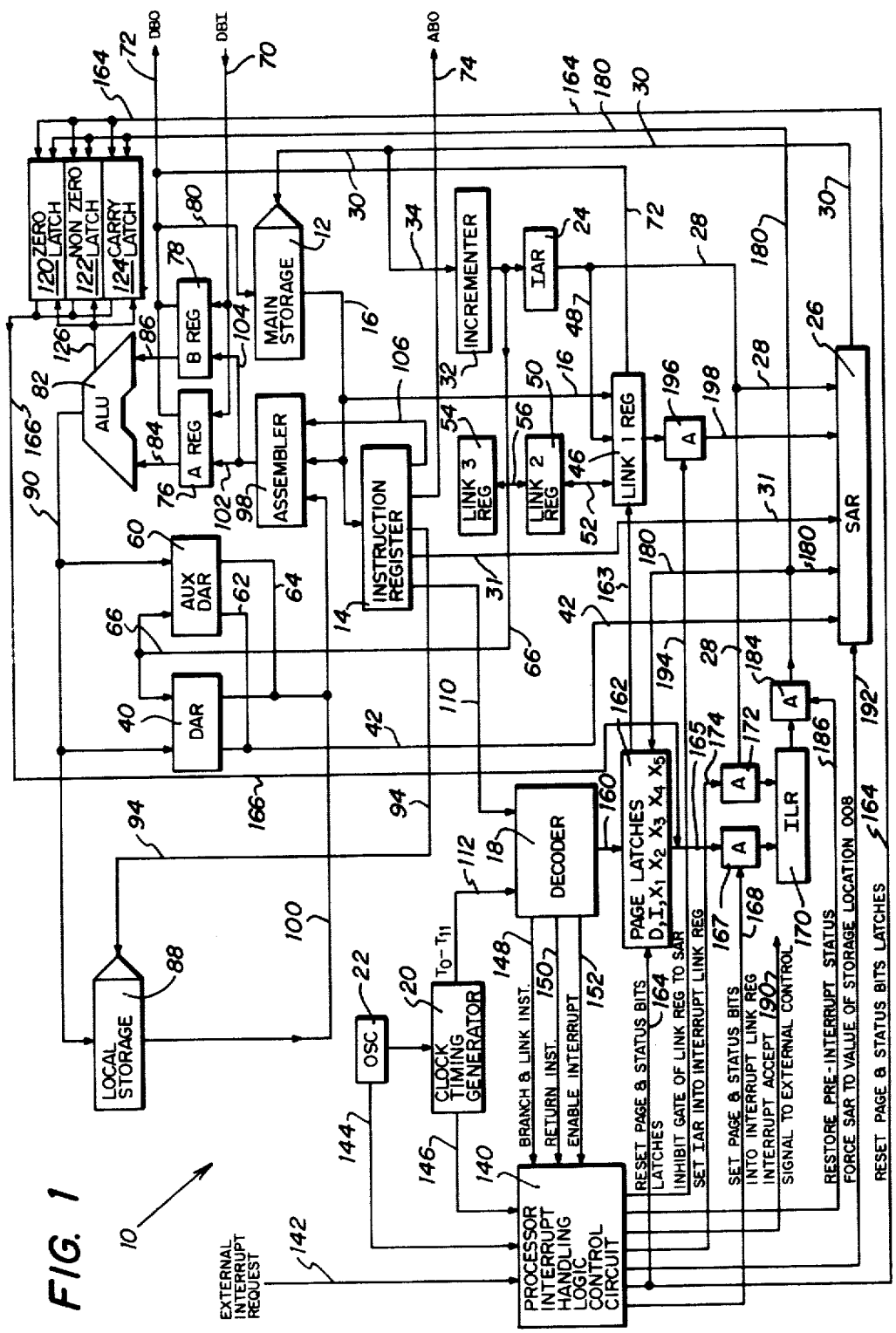
FIG. 1 is a schematic block diagram of a digital data processing system incorporating the link register system of the present invention.

Referring to FIG. 1, the major data flow elements and their manner of interconnection for an instruction pre-fetch microprocessor is illustrated. With certain minor exceptions, this same general form of microprocessor construction is shown and described in connection with FIG. 17 of U.S. Pat. No. 4,038,642 entitled "Input/Output Interface Logic for Concurrent Operations" granted to Bouknecht et al. on July 26, 1977 and assigned to International Business Machines Corporation of Armonk, N. Y. The microprocessor is generally identified by the numeral 10 and includes a main storage unit 12 for storing program instructions and data. A program is executed by reading its instructions out of main storage unit 12 in a sequential manner and by placing these instructions one at a time into an instruction register 14 via signal line 16.

Microprocessor 10 is controlled by the entry of 16-bit instructions into instruction register 14, wherein bits 0-2 define the instruction mode. Modes 0, 1 and 2 are utilized for arithmetic and logical instructions. Mode 3 is utilized for input/output instructions. Storage read and write instructions require two cycles and comprise modes 4 and 5. Modes 6 and 7 are utilized for branch instructions. The instruction code portion of the 16-bit instructions of instruction register 14 is utilized by a decoder 18 to generate necessary control signals within microprocessor 10. A clock timing generator 20 supplies Clock signals to decoder 18 which is driven by an oscillator 22.

Except for successful branch type instructions, the address of the next instruction resides in an instruction address register (IAR) 24. During execution of the current instruction in the instruction register 14, the next instruction address in IAR 24 is set into a storage address register (SAR) 26 via signal path 28 for purposes of addressing the next instruction in main storage unit 12 via signal path 30. Instruction register 14 is coupled to SAR 26 via signal path 31. The address in SAR 26 is transferred to main storage unit 12 during the execution of the current instruction to provide a pre-fetching of the next instruction. In other words, the next instruction is fetched during the same cycle that the current instruction is being executed. As the address in SAR 26 is transferred via signal path 30 to main storage unit 12, the address is also incremented by an incrementer 32 via signal path 34. The incremented address is set into IAR 24 to provide the address of the next following instruction therein.

If a successful branch type instruction is set into instruction register 14, a branch address is supplied from instruction register 14 or from an instruction addressable data address register (DAR) 40 or an auxiliary data address register (AUX DAR) 60 to SAR 26 via signal path 42 for purposes of fetching the next instruction. If a later return to the original branch point is desired, the contents of IAR 24 will, at this time, be placed in a link 1 register 46 via signal path 48 for enabling a later return to the next instruction following the program point from which the branch was made. A backup or link 2 register 50 is interconnected via signal path 52 to link 1 register 46. A backup or link 3 register 54 is interconnected via signal path 56 to link 2 register 50. Link 2 register 50 and link 3 register 54 provide storage for multiple return addresses for the case of multiple nested subroutines.

For purposes of either reading data from or writing data into main storage unit 12, the storage address is, in these cases, obtained from either DAR 40 or AUX DAR 60 interconnected to DAR 40 via signal paths 62 and 64. The storage address from the appropriate one of either DAR 40 or AUX DAR 60 is set into SAR 26 via signal path 42. At the same time, this storage address is incremented by incrementer 32 via signal path 34 and the incremented address may be supplied back via path 66 to the particular one of DAR 40 and AUX DAR 60 from which the unincremented address was obtained. It therefore can be seen that DAR 40 and AUX DAR 60 provide the same address function for data that IAR 24 provides for instructions.

Microprocessor 10 communicates with external sources via three primary busses. These busses include the Data Bus In (DBI) 70, Data Bus Out (DBO) 72 and an Address Bus Out (ABO) 74. The Address Bus Out 74 provides a plural-bit code from instruction register 14 which is used to select the external register or other circuit element which is to have its data placed on Data Bus In 70 or, alternatively, which is to receive the data present on Data Bus Out 72.

Incoming data received on Data Bus In 70 is set into an A register 76 and a B register 78. The data set in A register 76 and B register 78 may then be supplied directly to main storage unit 12 via bus 80 or, alternatively, the incoming data may be supplied to an arithmetic and logic unit (ALU) 82 via signal lines 84 and 86 to be ultimately supplied to a local storage unit 88 via signal path 90. Local storage unit 88 is comprised of a stack of addressable working registers for temporarily holding the data or other operands during their manipulation by microprocessor 10. Local storage unit 88 is addressed by way of an appropriate address field or fields contained in the instruction residing in instruction register 14 via signal line 94. For a typical register-to-register operation, the instruction will include two local storage address fields, one for each of the two operands which are to be involved in the operation.

The data or other operands contained in local storage unit 88 are read out by way of an assembler circuit 98 via signal line 100 and are set into one or the other of A register 76 or B register 78 via signal paths 102 and 104. Instruction register 14 is coupled to assembler circuit 98 via signal path 106. For the case of an arithmetic add instruction, for example, the contents of A register 76 are added to the contents of B register 78 by ALU 82 and the results are stored back into local storage unit 88. Alternatively, by way of an appropriate instruction from instruction register 14, the contents of A register 76 and B register 78 can be placed on Data Bus Out 72 for transfer to an appropriate register in the hardware to which microprocessor 10 is connected. As a further alternative, the contents of A register 76 and B register 78 may be transferred by an appropriate instruction to main storage unit 12 via bus 80.

When data is read out of main storage unit 12, it is supplied via assembler circuit 98 to A register 76 and B register 78. The data is then supplied via ALU 82 to local storage unit 88 or alternatively, the data may be placed on Data Bus Out 72 from A register 76 and B register 78.

Each instruction set into instruction register 14 includes an instruction code field. This instruction code field is supplied to decoder 18 via signal path 110. Decoder 18 also receives the $T_0$-$T_{11}$ Clock Timing signals from clock timing generator 20 via signal path 112. Decoder 18 decodes the instruction code field and issues the appropriate control signals at the appropriate moments to the various data flow control gates and to the appropriate registers for obtaining the desired movement of data or other operands for that particular instruction in microprocessor 10. When appropriate, decoder 18 also supplies the appropriate signals to ALU 82 for instructing it to add or subtract or perform some other logical function.

Associated with ALU 82 are ALU status latches 120, 122 and 124 interconnected via signal path 126 to ALU 82. ALU status latches 120, 122 and 124 enable the addition of numbers represented by more than four bits in which an add with carry is necessary and provide the mechanism to test the results of ALU 82 operation with branch instructions.

Decoder 18 generates a Branch and Link Instruction via signal line 148, a Return Instruction via signal line 150 and an Enable Interrupt Instruction via signal line 152 which are all applied to processor interrupt handling logic control circuit 140. Decoder 18 generates instructions via signal line 160 to page latches 162 having bits D, I, $X_1$, $X_2$, $X_3$, $X_4$ and $X_5$. Page latches 162 applies an output via signal line 163 to link register 46.

Processor interrupt handling control circuit 140 receives an External Interrupt Request signal via signal line 142 from peripheral devices (not shown) associated with microprocessor 10. Processor interrupt handling logic control circuit 140 receives an input from oscillator 22 via signal line 144 and an input from clock timing generator 20 via signal line 146.

The outputs of page latches 162 and ALU status latches 120, 122 and 124 are applied via signal paths 165 and 166 to an AND circuit 167 which sets the page and ALU 82 status bits into an Interrupt Link Register (ILR) 170 under the control of interrupt handling logic control circuit 140 via signal line 168. Processor interrupt handling logic control circuit 140 then generates the Reset Page and Status bits Latches signal via signal line 164 which is applied to page latches 162 and ALU status latches 120, 122 and 124. Processor interrupt handling logic control circuit 140 also generates the Interrupt Accept Signal to External Control via signal line 190 and the Force SAR to Value of Storage Location 008 signal via signal line 192 applied to SAR 26.

The output of IAR 24 is applied via signal line 28 to an AND circuit 172 which also receives the Set IAR Into Interrupt Link Register signal generated by processor interrupt handling logic control circuit 140 via signal line 174 to apply the contents of IAR 24 to ILR 170.

After the interrupt routine has been completed and processor 10 returns control to the main program, a return instruction will cause the output of ILR 170 to be applied to an AND circuit 184. AND circuit 184 also receives via signal line 186 the Restore Pre-Interrupt Status signal generated by processor interrupt handling Status signal control circuit 140. The output of AND circuit 184 restores the contents of page latches 162, SAR 26 and ALU status latches 120, 122 and 124 via signal line 180 to the values prior to the interrupt. Processor interrupt handling logic control circuit 140 also generates the Inhibit Gate of Link Register to SAR signal via signal line 194 which is applied to an AND circuit 196 to prevent the setting of the contents of link 1 register 46 into SAR 26 via signal line 198.

Figure 2:
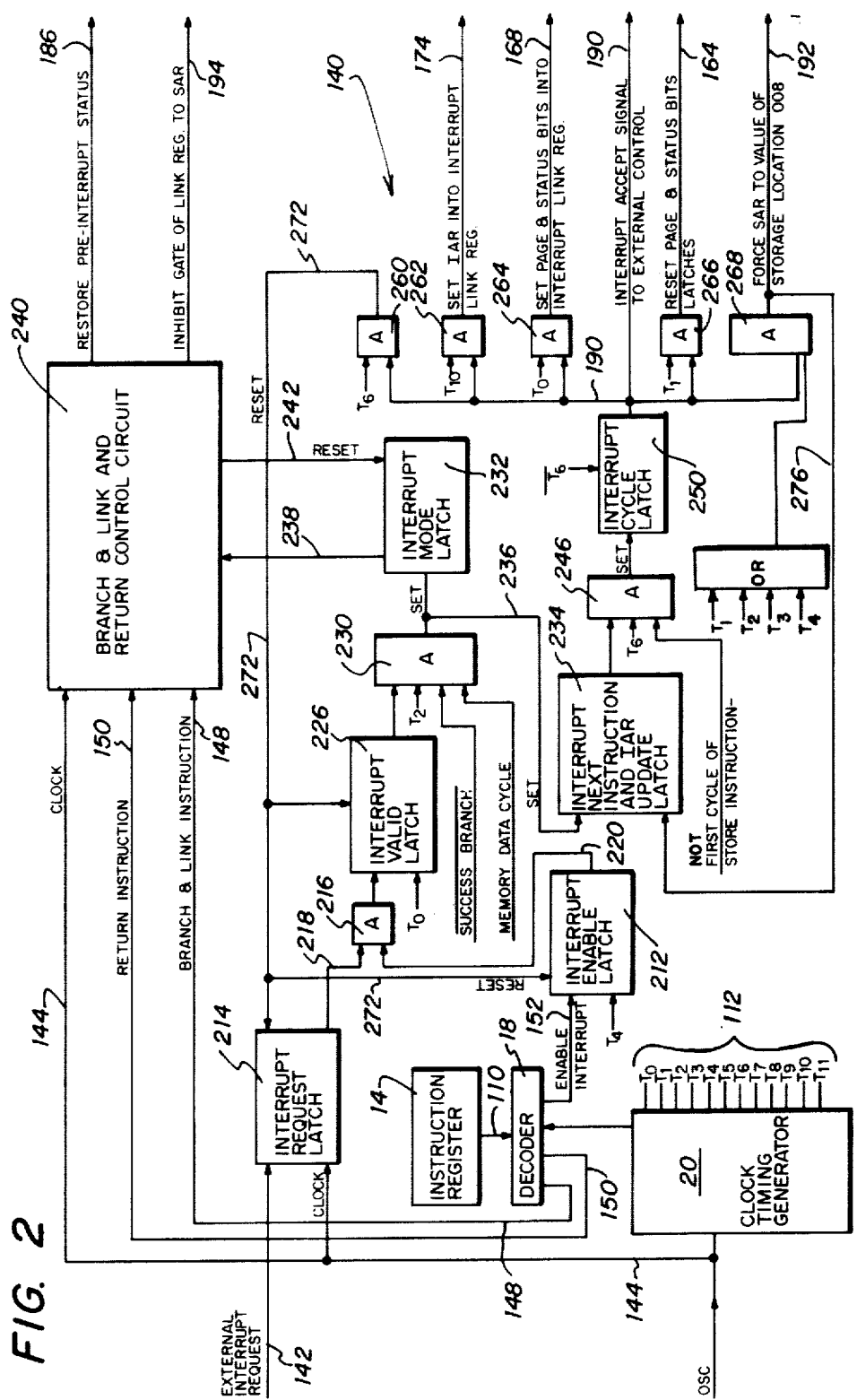
FIG. 2 is a schematic block diagram of the processor interrupt handling logic control circuit block shown in the schematic block diagram of FIG. 1.

Referring to FIG. 2, wherein like numerals are utilized for like and corresponding components previously identified, processor interrupt handling logic control circuit 140 is illustrated. Through operation of instruction register 14 and decoder 18 as previously discussed, the Enable Interrupt signal is generated via signal line 152 and is applied to an interrupt enable latch 212 to set interrupt enable latch 212. Interrupt enable latch 212 also receives the $T_4$ Clock signal from clock timing generator 20. The external Interrupt Request signal is applied to an interrupt request latch 214 via signal line 142 together with the Clock signal generated by oscillator 22 (FIG. 1) via signal line 144. Interrupt request latch 214 may comprise, for example, a dual D positive edge triggered flip-flop without internal reset capability.

The output of interrupt request latch 214 and interrupt enable latch 212 is applied to an AND circuit 216 via signal lines 218 and 220. Interrupt request latch 214 is not automatically reset in the absence of External Interrupt Request signal but is reset by a reset signal to be subsequently described. If interrupt enable latch 212 is not set when and External Interrupt Request occurs in order to set interrupt request latch 214, interrupt request latch 214 is held set until the Enable Interrupt signal is generated to set interrupt enable latch 212.

The output of AND circuit 216 is applied to an interrupt valid latch 226 which is clocked at time $T_0$. The output of AND circuit 216 also causes the clock of microprocessor 10 to be restarted if during any prior operation it had been stopped.

The output of interrupt valid latch 226 is applied to an AND circuit 230 which receives the $T_2$ Clock signal. If microprocessor 10 is not performing a successful branch operation and is not performing a memory data cycle, the $\overline{\text{Successful Branch}}$ signal and the $\overline{\text{Memory Data Cycle}}$ signal are applied to AND circuit 230. The output of AND circuit 230 will then set an interrupt mode latch 232 and an interrupt next instruction and IAR update latch 234 via signal line 236. The microprocessor 10 mode 4 and mode 5 operations require both an instruction fetch and a memory fetch for data. If microprocessor 10 is not performing a Memory Data Cycle or a Successful Branch, at Clock time $T_2$ interrupt mode latch 232 and IAR update latch 234 will be set so that the instruction being fetched while the current instruction is being executed will be lost and the instruction address register 24 will still point to the next sequential instruction.

The output of interrupt mode latch 232 is applied via signal line 238 to a branch and link and return control circuit 240 of the present invention. When the interrupt routine is complete, branch and link and return control circuit 240 generates the Restore Pre-Interrupt Status signal via signal line 186 and the Inhibit Gate of Link Register to SAR signal via signal line 194. Also generated by branch and link and return control circuite 240 is a reset signal which is applied to interrupt mode latch 232 via signal line 242. Branch and link and return control circuit 240 will be subsequently described with reference to FIG. 3.

The output of IAR update latch 234 is applied to an AND circuit 246 which also receives the $T_6$ Clock signal. If microprocessor 10 is not in the first cycle of store instruction, the not First Cycle of Store Instruction signal is applied to AND circuit 246. The output of AND circuit 246 then sets an interrupt cycle latch 250 which also receives the not $T_6$ Clock signal. If microprocessor 10 is in the first cycle of store operation, this cycle must be completed and therefore interrupt cycle latch 250 will not be set. The output of interrupt cycle latch 250 generates the Interrupt Accept Signal to External Control signal via signal line 190 and further applies an input to AND circuits 260, 262, 264, 266 and 268.

AND circuit 260 receives the $T_6$ Clock signal to generate a reset signal which is applied via signal line 272 to interrupt valid latch 226, interrupt request latch 214 and interrupt enable latch 212. Interrupt enable latch 212 is reset immediately after an Enable Interrupt signal is received. At Clock time $T_{10}$, AND circuit 262 generates the set IAR into Interrupt Link Register signal via signal line 174 to set the contents of IAR 24 into ILR 170 (FIG. 1). At Clock time $T_0$, AND circuit 264 generates the Set Page and Status Bits Into Interrupt Link Register signal via signal line 168. At Clock time $T_1$, AND circuit 266 generates the Reset Page and Status Bits Latches signal via signal line 164 which is applied to page latches 162 and ALU status latches 120, 122 and 124 (FIG. 1). At Clock times $T_1$-T, AND circuit 268 forces the value contained in SAR 26 (FIG. 1) to the value of a storage location 008 of main storage 12 via signal line 192 and also applies an input to latch 234 via signal line 276.

Figure 3:
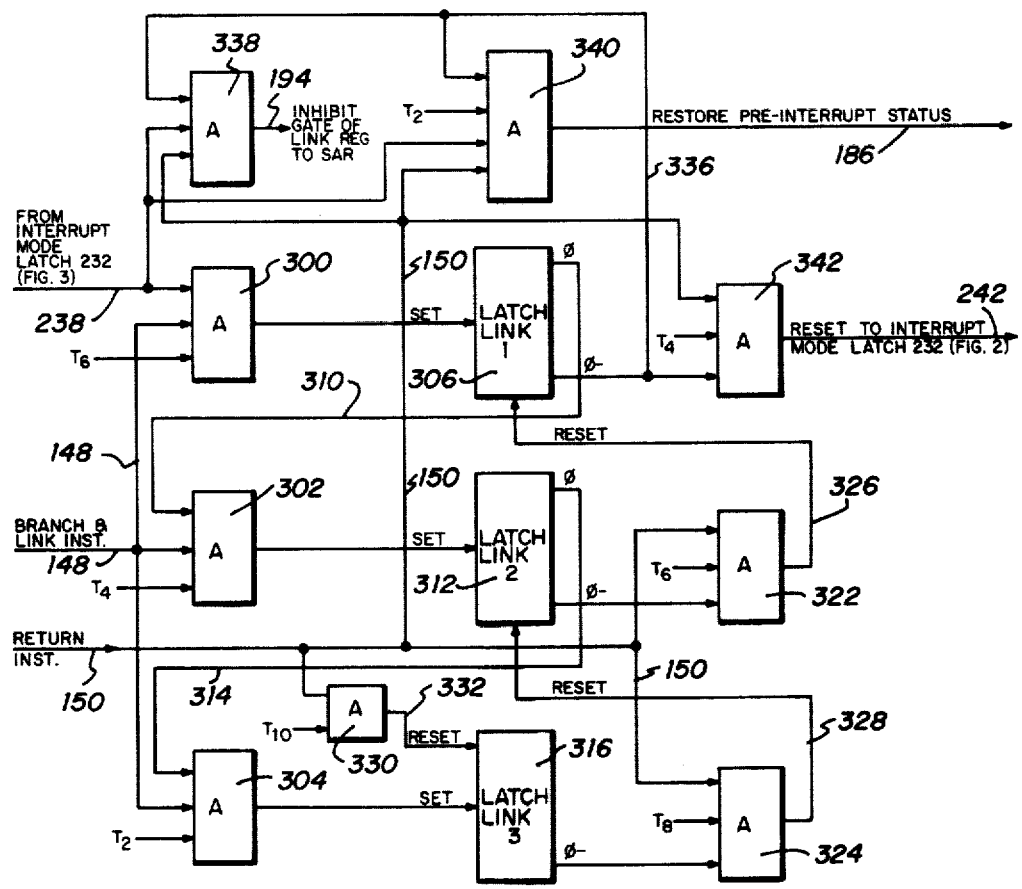
FIG. 3 is a schematic block diagram of the branch and link and return control circuit of the present invention shown in the schematic block diagram of FIG. 2.

Referring to FIG. 3, branch and link and return control circuit 240 (FIG. 2) of the present invention is illustrated. The output of interrupt mode latch 232 (FIG. 2) is applied via signal line 238 to an AND circuit 300. Branch and Link Instructions from decoder 18 (FIG. 1) are applied to AND circuit 300 and to AND circuits 302 and 304 via signal line 148. The first time a Branch and Link Instruction is generated after an interrupt request and at Clock time $T_6$, AND circuit 300 generates an output to set a latch link 1, 306. The output of latch link 306 is applied via signal line 310 to AND circuit 302. At Clock time $T_4$, if a second Branch and Link Instruction is generated by decoder 18 (FIG. 1), AND circuit 302 will generate an output to set a latch link 2, 312. The output of latch link 312 is applied via signal line 314 to AND circuit 304. At Clock time $T_2$, if a third Branch and Link Instruction is generated by decoder 18 (FIG. 1) the output of AND circuit 304 will set a latch link 3, 316. Prior to the setting of latch link 306, at Clock times $T_2$ and $T_4$, latch links 312 and 316 will not be set as the setting of latch link 312 and latch link 316 depends on whether latch link 306 was previously set. Latch links 306, 312 and 316 when set, indicate the number of link registers 46, 50 and 54 (FIG. 1) that have been used in the interrupt routine.

When a Return Instruction is generated by decoder 18 via signal line 150 (FIG. 1), the contents of latch links 306, 312 and 316 are interrogated. At Clock time $T_2$, if interrupt mode latch 232 (FIG. 3) is set indicated by an output on signal line 238 (FIG. 3) which is applied to an AND circuit 340 and if latch link 306 has not been filled indicated by the output of latch link 306 applied via a signal line 336 to AND circuit 340 and if the Return Instruction signal is present applied via signal line 150 to AND circuit 340, AND circuit 340 generates the Restore Pre-Interrupt Status signal via signal line 186. At Clock time $T_4$, if latch links 306, 312 and 316 are not filled, an AND circuit 342 will generate the reset signal to interrupt mode latch 232 via signal line 242 (FIG. 2).

To reset latch links 306, 312 and 316, the Return Instruction signal generated by decoder 18 via signal line 150 is applied to AND circuits 322, 324 and 330. At Clock time $T_6$, if latch link 312 is not set indicating that link registers 50 and 54 (FIG. 1) are not currently being used by the interrupt routine, an output of AND circuit 322 will generate a reset signal via signal line 326 to reset latch link 306. At Clock time $T_8$ and if latch link 316 has not been previously set indicating that link register 54 (FIG. 1) is not currently being used by the interrupt routine, the output of AND circuit 324 will reset latch link 312 via signal line 328. At Clock time $T_{10}$, a Return Instruction via signal line 150 applied to an AND circuit 330 will generate a reset signal applied via signal line 332 to latch link 316 to thereby reset latch link 316. The output of latch link 306 is applied via signal line 336 to an AND circuit 338 which also receives the output of interrupt mode latch 232 (FIG. 2) via signal line 238 and the Return Instruction signal via signal line 150. AND circuit 338, if latch link 306 is reset, generates the Inhibit Gate of Link Register to SAR signal via signal line 194.

If therefore can be seen that branch and link and return control circuit 240 of the present invention, as illustrated in FIG. 3, functions to count the number of Branch and Link Instructions received by setting of the latch links 306, 312 and 316. When a Return Instruction is provided, latch links 306, 312 and 316 will be reset on subsequent Return Instructions. This arrangement allows for an indefinite number of Branch and Link Instructions and Return Instructions to be executed. Branch and link and return control circuit 240 will count the number of latch links 306, 312 and 316 filled as long as the number of Branch and Link Instructions is never more than three greater than the number of Return Instructions. When the number of Branch and Link Instructions equals the number of Return Instructions, link registers 46, 50 and 54 (FIG. 1) can be reloaded with the data that was stored in main store 12 at the beginning of the interrupt routine.

When the latch links 306, 312 and 316 are all reset, the next Return Instruction will cause the contents of ILR 170 (FIG. 1) to be set into page latches 162, ALU status latches 120, 122 and 124 and SAR 26 (FIG. 1) of microprocessor 10 where the information was initially resident. Microprocessor 10 will then resume processing at the program point where the interrupt occurred. Link registers 46, 50 and 54 thereafter can be reused in the resumed program routine. The loading of link registers 46, 50 and 54 does not affect the operation of branch and link and return control circuit 240 which counts the number of Branch and Link and Return Instructions during the interrupt routine.

To summarize the operation of the present invention, when an interrupt occurs from a peripheral device associated with microprocessor 10, via the External Interrupt Request signal, the contents of instruction address register 24 together with paging information stored in page latches 162 and ALU status bits of ALU status latches 120, 122 and 124 are saved and are into ILR 170 (FIG. 1). Since it is desirable to execute Branch and Link Instructions while in the interrupt mode or interrupt subroutine, the contents of link registers 46, 50 and 54 must be emptied and saved. This storage may be accomplished, for example, by executing store link instructions.

When an interrupt is taken, interrupt mode latch 232 (FIG. 2) is set and remains set until the contents of Interrupt Link Register 170 have been restored to the registers and latches of microprocessor 10 where the information was originally held prior to occurrence of the interrupt request. After any interrupted program data in one or more of link registers 46, 50 and 54 is stored in main storage unit 12 (FIG. 1), link registers 46, 50 and 54 may then be used during the interrupt routine. When Branch and Link Instructions are being executed and the interrupt mode latch 232 (FIG. 2) is set, operation of branch and link and return control circuit 240 causes latch links 306, 312 and 316 (FIG. 3) to be set and to indicate the number of link registers 46, 50 and 54 (FIG. 1) that were filled by the Branch and Link Instructions.

When a Return Instruction is provided through decoder 18 (FIG. 1) latch links 306, 312 and 316 (FIG. 3) will indicate the number of link registers 46, 50 and 54 that are filled and will be adjusted to indicate the remaining link registers 46, 50 and 54 that are filled. The present invention therefore allows an indefinite number of Branch and Link Instructions and Return Instructions to be executed, and will determine the number of link registers, 46, 50 and 54 filled as long as the number of Branch and Link Instructions is never more than three greater than the number of Return Instructions. When the number of Branch and Link Instructions is equal to the number of Return Instructions, link registers 46, 50 and 54 may be reloaded with the data interrupted program that was stored in main storage unit 12 immediately following acceptance of the External Interrupt Request.

Figure 4:
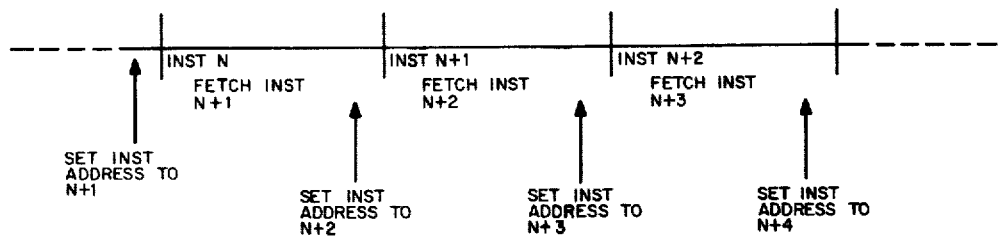
FIG. 4 is a timing diagram graphically summarizing the operation of an instruction pre-fetch microprocessor.

An important aspect of the present invention is that the store link and load link instructions do not set or reset latch links 306, 312 and 316 (FIG. 3) indicating that link registers 46, 50 and 54 are filled. When latch links 306, 312 and 316 are reset, the next Return Instruction will cause the contents of ILR 170 to be set into the latches and registers of microprocessor 10 where the data was initially resident prior to the interrupt. Microprocessor 10 will then resume processing at the program point where the interrupt occurred. As a final phase of the interrupt routine, link registers 46, 50 and 54 are with the interrupted program data by means of load link instructions. As the final step in the interrupt routine, the additional Return Instruction is issued to cause the contents of ILR 170 to be set into page latches 162, ALU status latches 120, 122 and 124 and SAR 26. FIGS. 4-7 graphically illustrate various timing diagrams for the operation of the present invention. Referring initially to FIG. 4, the normal cycle operation of an instruction pre-fetch microprocessor system is illustrated. For example, during execution of instruction N, instruction N+1 is being fetched from memory such as main storage unit 12 (FIG. 1). At the completion of instruction N, the instruction address register (IAR 24) points to instruction N+2. Similarly, during execution of instruction N+1, instruction N+2 is being fetched and at the completion of instruction N+1, the instruction address register is set to the address of instruction N+3.

Figure 5:
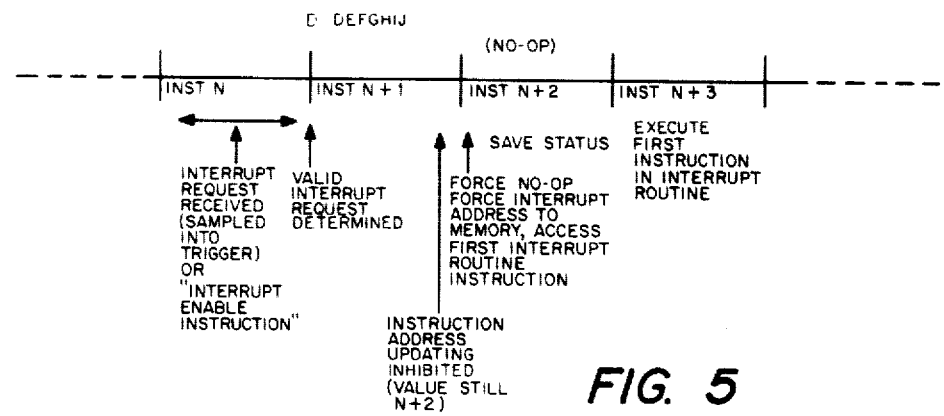
FIG. 5 is a timing diagram graphically summarizing the operation of an instruction cycle during a forced no instruction operation.

FIG. 5 illustrates the timing sequence when an interrupt has been enabled and an interrupt occurs during an instruction N or an interrupt has occurred previously and instruction N is an enable interrupt instruction. The interrupt request is received by the interrupt request latch 214 (FIG. 2). Decoder 18 (FIG. 1) generates the Enable Interrupt signal to be applied to interrupt enable latch 212 (FIG. 2) during execution of instruction N. The instruction address register 24 has been set to instruction N+1 which is being fetched from main storage unit 12. If microprocessor 10 is in the wait state, the interrupt request anded by AND circuit 216 with the output of interrupt enable latch 212 starts the system clock. The External Interrupt Request signal is clocked into interrupt request latch 214 (FIG. 2) and is sampled with the output of oscillator 22 (FIG. 1) during each microprocessor cycle and as indicated in FIG. 5, may occur at the beginning of instruction N+1. The Valid Interrupt Request signal is then generated and latched in interrupt valid latch 226. Instruction N+1 is then executed, but IAR 24 updating at the end of cycle N+1 is inhibited by operation of interrupt next instruction and IAR update latch 234 (FIG. 2). At the beginning of cycle N+2, the fixed interrupt storage address is sent to main storage unit 12 to begin fetching the first instruction in the interrupt routine. The fetching of the first instruction in the interrupt routine occurs in less than two cycles after the interrupt request was received which is an important aspect of the present invention illustrating the speed and efficiency of the present system. Also, during instruction cycle N+2, the ALU status bits stored in latches 120, 122 and 124, the contents of page latches 162 and the contents of IAR 24 which is instruction address N+2 are stored in ILR 170. Further, instruction N+2 is forced to a no operation. During instruction cycle N+3, the first instruction in the interrupt routine is executed.

Figure 6:
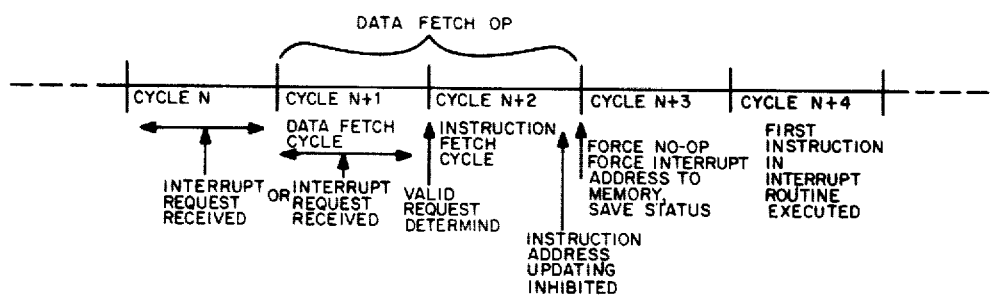
FIG. 6 is a timing diagram graphically summarizing the operation of a data fetch instruction.
Figure 7:
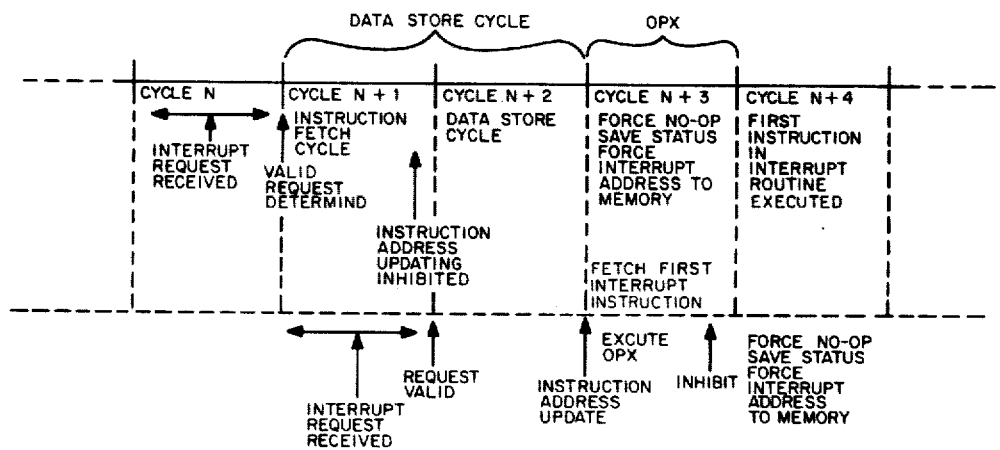
FIG. 7 is a timing diagram graphically summarizing the operation of a data store instruction.

Referring simultaneously to FIGS. 6 and 7, if instruction N+1 is a successful branch, then instruction address register 24 must be updated at the end of instruction N+1 so that the interrupt is then postponed for one cycle or until a nonsuccessful branch or other instruction is executed. Data store and data fetch instructions require two cycles since two memory references must be taken. If interrupt enable latch 212 (FIG. 2) is set and an interrupt occurs in the cycle preceding the data memory reference, the interrupt is processed as shown in FIGS. 6 and 7 in which the first instruction in the interrupt routine is executed during instruction N+4.

It therefore can be seen that the present link register system permits storage and reloading of existing link registers during execution of an interrupt mode of a microprocessor. The link registers can be initialized for branch and link transfers to subroutines. Hardware circuitry determines the difference in the number of Branch and Link Instructions and Return Instructions in the interrupt mode. Only one form of Return Instruction is required to control branching from both the link registers and an interrupt link register.

Whereas the present invention has been described with respect to specific embodiments thereof, it will be understood that various changes and modifications will be suggested to one skilled in the art, and it is intended to encompass such changes and modifications that fall within the scope of the appended claims.

What is claimed is:

1. In an interruptable stored-program data processing system which includes a storage unit for storing instructions, an instruction register for receiving stored instructions from the storage unit, a storage address register for addressing the storage unit, an instruction address register for normally providing to the storage address register the address of the instruction which follows the instruction held in the instruction register, a stack of link registers interconnected to form a last-in-first-out stack, circuitry responsive to a branch instruction in the instruction register for providing a branch address to the storage address register and for transferring the address in the instruction address register to the link register stack, circuitry responsive to a return instruction in the instruction register for transferring the last entered instruction address from the link register stack to the storage address register, and interrupt circuitry responsive to an interrupt request from a peripheral unit for switching the data processing system to an interrupt mode and forcing an interrupt routine starting address into the storage address register, an interrupt mode control mechanism for the link register stack comprising:

circuitry responsive to store link instructions in the instruction register during the initial phase of the interrupt routine for transferring the contents of the link register stack to a predetermined save area in the storage unit;

monitoring circuitry responsive to branch instructions and return instructions in the instruction register during the interrupt mode for monitoring the usage of the link register stack by the interrupt routine for producing a stack empty signal when no interrupt routine link addresses are pending in the stack;

circuitry responsive to load link instructions in the instruction register during the final phase of the interrupt routine for transferring the previously saved link register contents from the storage unit back to the link register stack;

and circuitry responsive to the stack empty signal and to a return instruction in the instruction register at the end of the interrupt routine for switching the data processing system back to the normal operating mode.

2. A link register stack interrupt mode control mechanism in accordance with claim 1 wherein the monitoring circuitry includes:

a plurality of latch circuits equal in number to the number of link registers in the link register stack;

circuitry coupled to the latch circuits and responsive to each branch instruction in the instruction register for increasing by one the number of the latch circuits which are in a predetermined binary state;

circuitry coupled to the latch circuits and responsive to each return instruction in the instruction register for decreasing by one the number of the latch circuits which are in the predetermined binary state;

and circuitry coupled to the latch circuit which is the first to be set to the predetermined binary state for providing the stack empty signal when such latch circuit is not in the predetermined binary state.

* * * * *